United States Patent [19]
Barrett et al.

[11] 4,341,566
[45] Jul. 27, 1982

[54] EUTECTIC MIXTURE AS A FLUX FOR GLASS MELTS

[75] Inventors: Wayne T. Barrett, Malvern; Patrick M. Brown, Exton, both of Pa.

[73] Assignee: Foote Mineral Co., Exton, Pa.

[21] Appl. No.: 230,520

[22] Filed: Feb. 2, 1981

[51] Int. Cl.³ .................. C04B 35/60; C09K 3/00; C03B 1/00
[52] U.S. Cl. .................. 106/313; 65/134; 65/136; 501/27
[58] Field of Search .......... 65/134, 136; 106/313; 501/27, 31, 70

[56] References Cited

U.S. PATENT DOCUMENTS 3,589,885  6/1971  Monks .................. 65/134

Primary Examiner—Richard V. Fisher
Attorney, Agent, or Firm—Howson and Howson

[57] ABSTRACT

A novel flux for glass compositions which is an eutectic mixture of lithium carbonate and sodium sulfate (liquidus temperature 496° C.) is used in fiberizable glass compositions to improve fluidity and reduce the temperature of fusion of the raw materials of which the glass is formed.

15 Claims, 1 Drawing Figure

BINARY FREEZING POINT DIAGRAM
FOR $Li_2CO_3 - Na_2SO_4$ SYSTEM

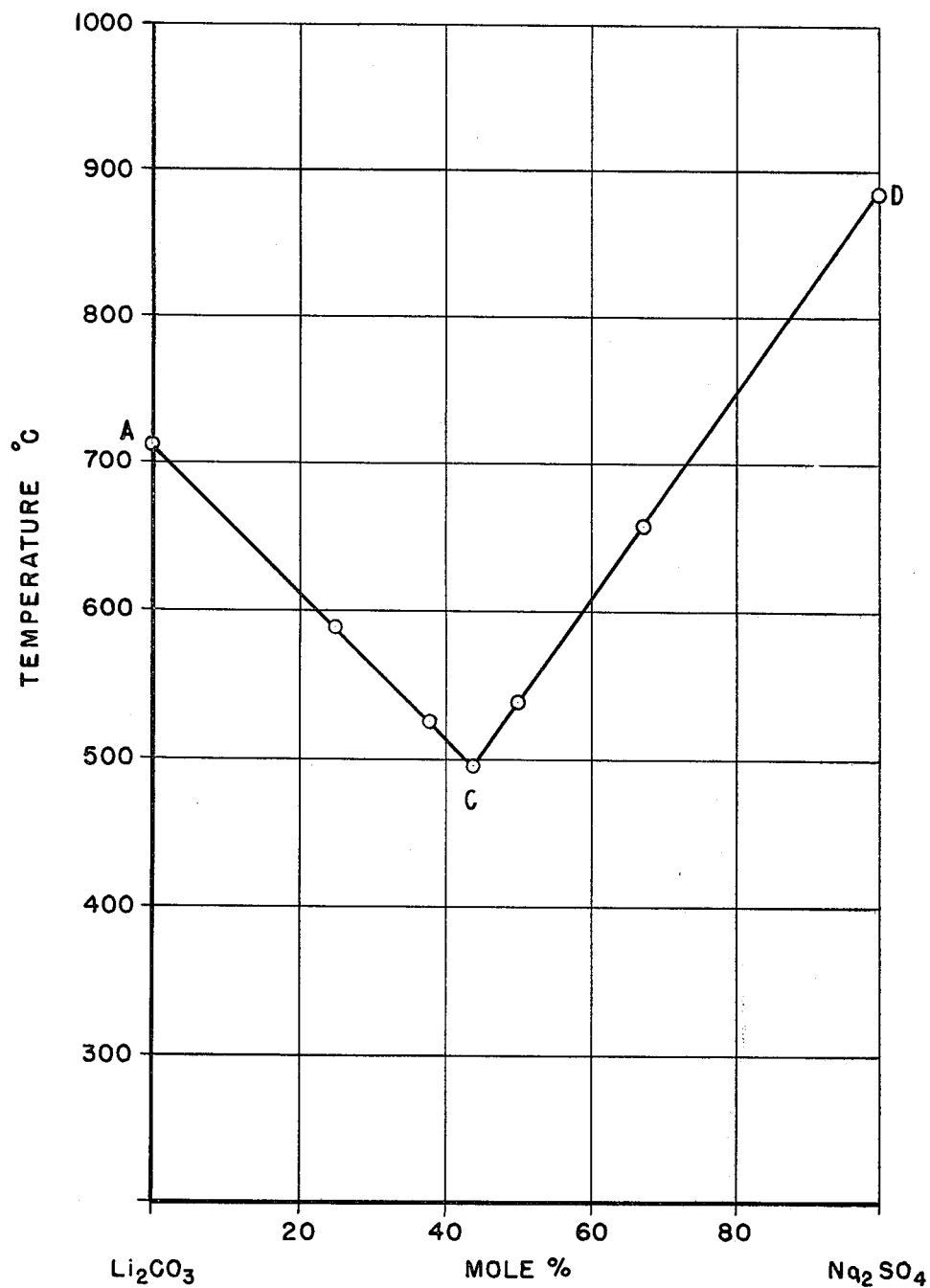

EUTECTIC MIXTURE AS A FLUX FOR GLASS MELTS

BACKGROUND OF THE INVENTION

Glass fibers, by reason of their relative chemical inertness, high temperature stability, and moderate cost have found particular use as a thermal insulation for buildings, industrial equipment, and pipes. The growth of the insulation market for glass fibers has rapidly increased in recent years by reason of the demand for additional insulation in both new and existing buildings due to ever increasing fuel costs.

Glass fibers for insulation use are typically formed from a high-silica, soda-lime glass containing on the order of at least about 60 percent by weight of silica and about 12 percent or somewhat more of sodium as the oxide, together with significant amounts of lime, e.g. 5–10 percent of CaO.

A glass commonly employed in the manufacture of glass fibers for insulation use has the approximate composition:

TABLE I

| Component | Percent by Weight |
|---|---|
| $SiO_2$ | 61.2 |
| $Al_2O_3$ | 4.0 |
| $Fe_2O_3$ | 0.2 |
| CaO | 8.0 |
| MgO | 3.3 |
| $B_2O_3$ | 7.5 |
| $Na_2O$ | 14.25 |
| $K_2O$ | 1.3 |

Such glass composition has a melting point on the order of about 1004° C.

As is well known in the glass-making art, control of the softening and melting temperatures to provide the glass composition with greater fluidity is important in the formation of glass filaments. In order to promote melting and dissolution of the raw materials in the charge and to reduce the melting point of the glass, fluxes such as sodium carbonate, calcium fluoride, and sodium nitrate have been added to the charge of glass-forming components.

For example, in the manufacture of high-silica glasses, examples of which are soda-lime, borosilicate, and aluminosilicate glasses, the solid constituents, in the proper proportions, are dry blended, as for example in a pan type mixer. Small amounts of water may be added for further wet blending. When the intimately mixed batch is charged into a heated furnace, a series of melting, dissolution, volatilization, and redox reactions takes place between the materials, in a particular order and at the appropriate temperatures. The purposes of the flux is to accelerate dissolution of the more refractory (higher melting) grains, such as sand. However, using a flux such as sodium nitrate, oxides of nitrogen are generated during the glass-making operation. Such oxides are highly corrosive to plant equipment and are air pollutants in the plant effluent. Therefore, expensive pollution control measures must be taken when using sodium nitrate as a flux.

The use of lithium carbonate as a flux in glass-making has been suggested. For example, U.S. Pat. No. 4,066,466 discloses a process in which lithium carbonate is added as a flux to standard compositions used in the manufacture of glass fibers, such as "621" or "E" glass compositions, in place of calcium fluoride, to reduce the liquidus and softening temperatures of the glass composition. Although the use of such compound reduces fluorine emissions in the stack gases of glass furnaces, such use presents other problems.

It has been determined that when lithium carbonate is substituted for a flux comprising a mixture of sodium nitrate and sodium sulfate (3:1 weight ratio), the fluidity of the glass batch is improved. Unfortunately, it was observed that after about three days' operation, a crust of unmelted raw materials in excess of one foot in thickness built up, and the rate of dissolution of the raw mix was greatly diminished. It is believed that such undesirable results are attributable to the high liquidus temperature of lithium carbonate, which is about 722° C. By the term "liquidus temperature" as used herein is meant that temperature at which the composition begins to solidify upon cooling after being heated to a temperature at which the composition is in the liquid phase.

It is an object of the present invention to provide a novel flux composition which reduces the dissolution temperature of raw materials used in the glass-making operation.

It is another object of this invention to provide an improved process for making glass of greater fluidity particularly suitable for spinning of glass fibers for insulation or other use.

A further object of this invention is the provision of a novel process for making glass without use of a flux which decomposes to form corrosive materials or atmospheric pollutants.

Other objects and advantages of the invention will become apparent from the following description and accompanying drawing, which is a binary freezing-point diagram for mixtures of lithium carbonate and sodium sulfate.

SUMMARY OF THE INVENTION

It was discovered that the foregoing objects and advantages can be achieved according to the present invention by using, as a flux in the manufacture of glass, an eutectic composition comprising about 56 mole percent lithium carbonate and 44 mole percent sodium sulfate. It was observed that such eutectic composition could be substituted for such well-known fluxes as calcium fluoride and mixtures of sodium nitrate and sodium sulfate, which fluxes decompose during the glass-making process with evolution of gaseous pollutants in the form of fluorine and oxides of nitrogen, respectively. Thus, the novel flux of this invention overcomes a serious air pollution problem. In addition, the novel flux causes dissolution of raw materials of which the glass is made at relatively low temperatures, and the resulting glass composition has improved fluidity, which enhances spinning of glass fibers suitable for insulation and other uses.

BRIEF DESCRIPTION OF DRAWING

The FIGURE illustrates a binary freezing point diagram with reference to lithium carbonate and sodium sulfate.

DETAILED DESCRIPTION OF THE INVENTION

As noted previously, lithium carbonate provides glass compositions such as a high-silica glass, e.g. soda-lime glass, useful in the manufacture of glass fibers, with greater fluidity. Unfortunately, however, by reason of the relatively high liquidus temperature of this compound, i.e. 722° C., when used in the manufacture of large commercial size batches of glass, it forms a crust with other constituents of the raw mix, whereby the rate of dissolution of the mix is reduced to such an extent that the process becomes uneconomical, requiring considerably higher temperatures to effect dissolution of the glass-forming constituents.

It was discovered that lithium carbonate and sodium sulfate form a binary eutectic composition having a liquidus temperature, also referred to as a freezing point, of approximately 496° C. It was further discovered that by using such eutectic composition, the advantages resulting from the use of lithium carbonate as a flux could be retained, and the disadvantages due to the high liquidus temperature of lithium carbonate (722° C.) could be overcome.

The existence of an eutectic having a surprisingly low liquidus temperature (496° C.) as compared to the individual compounds of which it is comprised ($Li_2CO_3$, 722° C.; $Na_2SO_4$, 855° C.) was discovered by preparing a number of mixtures of lithium carbonate and sodium sulfate in different proportions. Each mixture was placed in a crucible and melted, and then allowed to cool, and freezing temperature was noted. In addition, a number of mixtures were examined by differential thermal analysis. With this additional data it was possible to construct the binary freezing point diagram of the FIGURE. X-ray diffraction patterns were made on all of the solids from the melts, and it was found that the solids are mixtures of lithium carbonate and two isomorphous forms of anhydrous sodium sulfate.

Specific mixtures used in providing the data from which the binary freezing point diagram of the FIGURE was constructed are set forth in Table II, below:

TABLE II

| Run No. | Mole Percent | |
|---|---|---|
| | $Li_2CO_3$ | $Na_2SO_4$ |
| A | 50 | 50 |
| B | 67 | 33 |
| C | 33 | 67 |
| D | 56 | 44 |
| E | 62 | 38 |

In the FIGURE, points A (722° C.) and D (885° C.) represent the freezing points of the pure compounds, lithium carbonate and sodium sulfate, respectively. As more and more sodium sulfate is added to the lithium carbonate, the freezing point is lowered as shown by the curve AC, and likewise, addition of lithium carbonate to sodium sulfate lowers the freezing point along the line DC. The curves AC and DC represent temperatures at which the liquid mixtures of various compositions are in equilibrium with solid lithium carbonate and sodium sulfate, respectively. At point C, which is the eutectic point, the liquid is in equilibrium with both lithium carbonate and sodium sulfate. As noted above, the freezing point of the eutectic composition is 496° C.

This invention also contemplates an improvement in the well-known process for the manufacture of glass wherein the raw materials of the proper grain size and in the desired amounts are intimately mixed together, and the resulting batch is charged into a hot furnace where the batch is converted into a homogeneous melt. The batch may be dry-blended initially in a pan-type mixer, and a small amount of water may be added for subsequent wet-blending.

The novel flux of this invention may be added to the batch of raw materials in the form of a finely-divided powder. By the term "finely divided" is meant that the average size of the particles of which the powder is formed is in the range of from about 10 to about 1000 microns.

The powdered flux can be either an intimate mixture containing 56 mole percent lithium carbonate and 44 mole percent sodium sulfate, each of the respective compounds being finely divided and having the above-stated average particle size, or on the other hand, the mixture of the two compounds in the above-stated proportions can be heated to obtain a melt, following which the mixture is cooled to obtain a solidified mass which is subsequently subjected to various well-known milling operations to obtain a powder formed of particles of the specified average particle size.

The quantity of the novel flux included in any batch of glass-forming constituents will depend upon a number of factors, such as the glass type, permissible alkali, furnace type, batch size, and the like. A major consideration is the temperature at which dissolution of the raw materials takes place. Preferably, the quantity of flux added to any batch is sufficient to cause dissolution of the several glass-forming constituents at a temperature substantially below that at which the constituents would dissolve in the absence of a flux. By so reducing the dissolution temperature, considerable savings in heating costs can be effected.

In the case of a high-silica glass, such as one having a composition as set forth in Table I, approximately 0.011 pounds of flux per pound of raw mix will ordinarily reduce the temperature at which the constituents in the batch become molten to less than about 900° C.

By reference to the FIGURE, it will be recognized that flux compositions having a small excess of those amounts of either lithium carbonate or sodium sulfate which are present in the eutectic composition can be used to obtain results, in terms of the melt temperature of the constituents of the raw material batch and fluidity, obtainable by use of the eutectic composition. Thus, this invention also includes the use of flux compositions containing from about 32 to 52 mole percent sodium sulfate.

The novel flux can be included in various glass compositions such as high-silica glass, including soda-lime glass, and those particularly suitable for manufacture of insulation-grade glass fibers such as "E" (see U.S. Pat. No. 4,066,466) and "621" (see U.S. Pat. No. 2,571,074).

For a better understanding of the invention, the following examples are given by way of illustration.

EXAMPLES

The following glass batch compositions were prepared:

TABLE III

| Example No. | WEIGHT % | | | | | |
|---|---|---|---|---|---|---|
| | 1 | 2 | 3 | 4 | 5 | 6** |
| Sand | 39.60 | 39.43 | 39.68 | 39.79 | 40.48 | 40.48 |
| Feldspar | 17.23 | 17.16 | 17.27 | 17.31 | 17.61 | 17.61 |
| Soda Ash | 18.54 | 17.76 | 17.87 | 17.02 | 15.58 | 15.58 |
| Limestone | 12.67 | 12.62 | 12.70 | 12.73 | 12.95 | 12.95 |
| Boric Acid | 6.65 | 6.62 | 6.66 | 6.68 | 6.80 | 6.80 |
| $MgCO_3$ | 4.62 | 4.60 | 4.63 | 4.64 | 4.72 | 4.72 |
| $K_2CO_3$ | 0.68 | 0.68 | 0.68 | 0.68 | 0.70 | 0.70 |
| $NaNO_3$ | — | 1.14 | — | — | — | — |
| $Na_2SO_4$ | — | — | — | — | — | 0.70 |
| $Li_2CO_3$ | — | — | 0.52 | 1.15 | — | 0.47 |

TABLE III-continued

| Example No. | WEIGHT % | | | | | |
|---|---|---|---|---|---|---|
| | 1 | 2 | 3 | 4 | 5 | 6** |
| $Li_2CO_3/Na_2SO_4$ eutectic* | — | — | — | — | 1.17 | — |

*56 mole % $Li_2CO_3$/44 mole % $Na_2SO_4$ prepared by heating mixture above liquidus temperature and solidifying resulting eutectic composition.
**Intimate mixture of separate compounds (56 mole % $Li_2CO_3$/44 mole % $Na_2SO_4$)

The raw materials were blended and 5 gram portions of the separate batches were placed in platinum boats, each being 1 cm. wide×0.75 cm. deep×9 cm. long. In each test two of the platinum boats were placed side-by-side in an alumina boat 2 cm. wide×1.5 cm. deep×12 cm. in length. The alumina boat containing the platinum boats was placed in a ceramic tube and the ends thereof were closed with firebrick plugs, one plug being slotted to receive a thermocouple. The sealed tube was then introduced to a gradient furnace (Robert Sims Co.). Temperatures inside the tube were measured every centimeter by the thermocouple, which traveled directly alongside the alumina boat. By such procedure, the temperature or point at which the melting of the charge began could be determined for the several samples held in the furnace for a fixed time at a specific hot end temperature.

Temperatures of the gradient furnace ranged from a high of 1050° C. to a low of 790° C. Results of glass batches tested are set forth in Table IV:

TABLE IV

| Example No. | % BY WEIGHT* | | | | | |
|---|---|---|---|---|---|---|
| | 1 | 2 | 3 | 4 | 5 | 6 |
| ANALYSIS | | | | | | |
| $SiO_2$ | 61.42 | 61.42 | 61.57 | 61.77 | 62.00 | 62.49 |
| $Al_2O_3$ | 4.01 | 4.01 | 4.02 | 4.04 | 4.05 | 4.08 |
| $Na_2O$ | 14.30 | 14.30 | 13.84 | 13.26 | 12.72 | 12.58 |
| $K_2O$ | 1.31 | 1.31 | 1.31 | 1.31 | 1.32 | 1.33 |
| $Fe_2O_3$ | 0.07 | 0.07 | 0.07 | 0.07 | 0.07 | 0.07 |
| CaO | 8.05 | 8.05 | 8.07 | 8.09 | 8.12 | 8.19 |
| MgO | 3.31 | 3.31 | 3.32 | 3.33 | 3.34 | 3.37 |
| $B_2O_3$ | 7.52 | 7.52 | 7.54 | 7.57 | 7.59 | 7.66 |
| $Li_2O$ | — | — | 0.25 | 0.55 | 0.77 | 0.22 |
| ~Melt Line °C.** | 1004 | 1014 | 996 | 938 | 907 | 854 |
| ~Melt Line °C.*** | — | 865 | — | — | 844 | 861 |

*Total $R_2O$ equivalents equal to 0.245 equivalents in each case.
**Heated 5 minutes using hot end temperature of 1050° C.
***Heated 90 minutes using hot end temperature of 927° C.

The melt line data in Table IV shows the improvements in terms of reduction of dissolution temperature of the constituents of the raw mix using the novel flux of this invention (see Examples 5 and 6) as compared to the use of lithium carbonate as a flux (Examples 3 and 4), or no lithium components (Examples 1 and 2).

EXAMPLE 7

This example illustrates the improved fluidity of glass compositions obtained using the novel eutectic flux of this invention as compared to a similar glass composition in which the flux is the standard sodium nitrate flux.

The raw materials used in preparing the respective glass compositions had the following compositions:

TABLE V

| Constituent | Weight Percent | | |
|---|---|---|---|
| | Example 7A | Example 7B | Example 7C |
| Sand | 39.43 | 39.43 | 39.43 |
| Feldspar | 17.16 | 17.16 | 17.16 |
| Soda Ash | 17.76 | 17.76 | 17.76 |
| Limestone | 12.62 | 12.62 | 12.62 |
| Boric Acid | 6.62 | 6.62 | 6.62 |
| $MgCO_3$ | 4.60 | 4.60 | 4.60 |
| $K_2O_3$ | 0.68 | 0.68 | 0.68 |
| $NaNO_3$ | 1.14 | — | — |
| Eutectic* | — | 1.14 | — |
| $Li_2CO_3$** | — | — | 0.45 |
| $Na_2SO_4$** | — | — | 0.69 |

*56 mole percent $Li_2CO_3$/44 mole percent $Na_2SO_4$
**Present in the composition as an imtimate mixture of finely divided particles - 56 mole percent $Li_2CO_3$/44 mole percent $Na_2SO_4$ As can be seen by reference to Table V, the only difference between the composition of Example 7A and Examples 7B and 7C, respectively, is that in Example 7A the flux consists of 1.14 percent $NaNO_3$, whereas in the composition of Example 7B, the flux was 1.14 percent of the eutectic, obtained by heating a mixture of $Li_2CO_3$ and $Na_2SO_4$ to melt the constituents, followed by cooling to solidify the resulting eutectic and finely dividing the same, and in Example 7C the flux was merely a mixture of $Li_2CO_3$ and $Na_2SO_4$ in eutectic proportions.

In each example, the raw materials were blended together and placed in a fire clay crucible. In one experiment, a crucible containing the composition of Example 7A and another containing the composition of Example 7B were placed side-by-side in an electronically heated furnace at a temperature of 1232° C. where they were maintained for a period of one hour. In another experiment, the same procedure was used; however, one crucible contained the composition of Example 7A and the other contained the composition of Example 7C.

In each experiment, at the end of the heating period the respective crucibles were removed from the furnace together and poured simultaneously into separate graphite molds to obtain a glass disc. Fluidity of the respective compositions was determined by the amount of glass poured into the graphite molds in a given time. The composition of the respective glass batches and their fluidities as illustrated by disc weights are set forth in Table VI:

TABLE VI

| Constituent | Weight Percent | | |
|---|---|---|---|
| | Example 7A | Example 7B | Example 7C |
| $SiO_2$ | 61.37 | 61.37 | 61.37 |
| $Al_2O_3$ | 4.01 | 4.01 | 4.01 |
| $Na_2O$ | 14.15 | 14.15 | 14.15 |
| $K_2O$ | 1.30 | 1.30 | 1.30 |
| $Fe_2O_3$ | 0.07 | 0.07 | 0.07 |
| CaO | 8.04 | 8.04 | 8.04 |
| MgO | 3.31 | 3.31 | 3.31 |
| $B_2O_3$ | 7.52 | 7.52 | 7.52 |
| $Li_2O$ | — | 0.22 | 0.22 |
| Fluidity (g) | 55.98 | 59.90 | 70.21 |

As can be seen by reference to the fluidity data set forth in Table VI, the fluidity of glass compositions containing the eutectic flux of the present invention (Examples 7B and 7C) is considerably greater than the same composition containing sodium nitrate flux. In addition, the problem of air pollution due to the evolution of oxides of nitrogen is overcome by using the novel eutectic flux.

EXAMPLE 8

The procedure of Examples 1-6 was used to determine the dissolution temperatures of the compositions of Examples 7A, 7B, and 7C. The results are given in Table VII:

TABLE VII

| Example | Melt Temperature, °C. |
|---------|----------------------|
| 7A | 878 |
| 7B | 839 |
| 7C | 878 |

What is claimed is:

1. An eutectic composition particularly useful as a flux in glass manufacture comprising about 56 mole percent lithium carbonate and about 44 mole percent sodium sulfate.

2. A composition according to claim 1 in the form of a finely divided powder.

3. A composition according to claim 2 in which said particles forming said powder have an average particle size of from about 10 to about 1000 microns.

4. A composition according to claim 1 in the form of a finely divided powder obtained by intimately mixing particles of lithium carbonate and sodium sulfate, heating said mixture to a temperature sufficient to obtain molten composition, cooling the composition to solidify same, and reducing the solidified mass to a finely divided powder.

5. A composition according to claim 4 in which said particles forming said powder have an average particle size of from about 10 to about 1000 microns.

6. A composition according to claim 1 in the form of a powder comprising an intimate mixture of finely divided lithium carbonate and sodium sulfate.

7. A composition according to claim 6 in which said particles forming said powder have an average particle size of from about 10 to about 1000 microns.

8. In the manufacture of glass wherein the solid raw materials in specified proportions are intimately mixed together and the mixture is converted at high temperatures to a homogeneous melt, the improvement which comprises including in said mixture as a flux an eutectic composition comprising from about 48 to about 68 mole percent lithium carbonate and from about 32 to about 52 mole percent sodium sulfate, said flux being in the form of a finely divided powder obtained by intimately mixing particles of lithium carbonate and sodium sulfate, heating said mixture to a temperature sufficient to obtain a molten composition, cooling the resulting composition to solidify same, and reducing the solidified mass to a finely divided powder.

9. The process according to claim 8 in which said particles forming said powdered flux have an average particle size of from about 10 to about 1000 microns.

10. In the manufacture of glass wherein the solid raw materials in specified proportions are intimately mixed together and the mixture is converted at high temperatures to a homogeneous melt, the improvement which comprises including in the mixture as a flux an eutectic composition comprising about 56 mole percent lithium carbonate and about 44 mole percent sodium sulfate.

11. The process according to claim 10 in which said flux is in the form of a finely divided powder obtained by intimately mixing particles of lithium carbonate and sodium sulfate, heating said mixture to a temperature sufficient to obtain a molten composition, cooling the resulting composition to solidify same, and reducing the solidified mass to a finely divided powder.

12. The process according to claim 10 in which said flux is in the form of a powder comprising an intimate mixture of finely divided lithium carbonate and sodium sulfate.

13. The process according to claim 12 in which said particles forming said powder have an average particle size of from about 10 to about 1000 microns.

14. The process according to claim 10 in which the glass produced is a high-silica glass.

15. The process according to claim 14 in which the amount of said flux present in said mixture is sufficient to cause dissolution of the raw materials forming said mixture at a temperature below about 900° C.

* * * * *